United States Patent
Li

(10) Patent No.: US 11,812,270 B2
(45) Date of Patent: Nov. 7, 2023

(54) METHOD FOR IDENTIFYING PSEUDO BASE STATION, APPARATUS, AND MOBILE TERMINAL

(71) Applicants: Shenzhen HeyTap Technology Corp., Ltd., Guangdong (CN); GUANGDONG OPPO MOBILE TELECOMMUNICATIONS CORP., LTD., Guangdong (CN)

(72) Inventor: Weiqing Li, Guangdong (CN)

(73) Assignees: SHENZHEN HEYTAP TECHNOLOGY CORP., LTD., Shenzhen (CN); GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 303 days.

(21) Appl. No.: 17/244,651

(22) Filed: Apr. 29, 2021

(65) Prior Publication Data

US 2021/0250770 A1 Aug. 12, 2021

Related U.S. Application Data

(63) Continuation of application No. PCT/CN2018/113205, filed on Oct. 31, 2018.

(51) Int. Cl.
*H04M 1/66* (2006.01)
*H04W 12/12* (2021.01)
(Continued)

(52) U.S. Cl.
CPC .......... *H04W 12/12* (2013.01); *H04B 17/318* (2015.01); *H04J 11/0069* (2013.01); *H04W 48/08* (2013.01); *H04W 64/003* (2013.01)

(58) Field of Classification Search
CPC ... H04W 12/12; H04W 48/08; H04W 64/003; H04B 17/318; H04J 11/0069
See application file for complete search history.

(56) References Cited

U.S. PATENT DOCUMENTS

| 2008/0046258 | A1 | 2/2008 | Mechaley |
| 2011/0188472 | A1* | 8/2011 | Jeon ................ H04W 36/00837 370/331 |

(Continued)

FOREIGN PATENT DOCUMENTS

| CN | 103619030 A | 3/2014 |
| CN | 103796241 A | 5/2014 |

(Continued)

OTHER PUBLICATIONS

Extended European Search Report for EP Application 18939097.4 dated Jul. 26, 2021. (8 pages).

(Continued)

*Primary Examiner* — Justin Y Lee
(74) *Attorney, Agent, or Firm* — Young Basile Hanlon & MacFarlane, P.C.

(57) ABSTRACT

A pseudo base station identification method, device and mobile terminal are provided. The method includes: a mobile terminal acquiring a TAC value of a detected base station; obtaining a reference TAC value, the reference TAC value being a TAC value of a legitimate base station; comparing the TAC value of the detected base station to the reference TAC value; if a difference between the TAC value of the detected base station and the reference TAC value meets a target condition, determining that the detected base station is a pseudo base station.

16 Claims, 6 Drawing Sheets

(51) Int. Cl.
    *H04B 17/318*    (2015.01)
    *H04J 11/00*    (2006.01)
    *H04W 48/08*    (2009.01)
    *H04W 64/00*    (2009.01)

(56) References Cited

U.S. PATENT DOCUMENTS

| | | | |
|---|---|---|---|
| 2015/0264603 A1* | 9/2015 | Yang | H04W 36/24 |
| | | | 455/436 |
| 2015/0373680 A1 | 12/2015 | Park et al. | |
| 2019/0132740 A1* | 5/2019 | De | H04L 63/20 |

FOREIGN PATENT DOCUMENTS

| | | |
|---|---|---|
| CN | 104581731 A | 4/2015 |
| CN | 107683617 A | 2/2018 |
| CN | 107959936 A | 4/2018 |
| CN | 108012271 A | 5/2018 |
| CN | 108093407 A | 5/2018 |
| CN | 108174384 A | 6/2018 |
| EP | 2003818 A1 | 11/2018 |
| EP | 3298814 B1 | 5/2019 |

OTHER PUBLICATIONS

International Search Report with English Translation for PCT/CN2018/113205 dated Jul. 25, 2019 (12 pages).
Chinese First Office Action with English Translation for CN Application 201880097999.2 dated Nov. 3, 2022. (17 pages).

* cited by examiner

Computer-readable storage medium 800 — 810

Program code configured to perform various operations provided in the method embodiments of the present disclosure

METHOD FOR IDENTIFYING PSEUDO BASE STATION, APPARATUS, AND MOBILE TERMINAL

CROSS-REFERENCE TO RELATED APPLICATION(S)

The present application is a continuation-application of International (PCT) Patent Application No. PCT/CN2018/113205 filed on Oct. 31, 2018, the entire contents of which are hereby incorporated by reference.

TECHNICAL FIELD

The present disclosure generally relates to mobile terminals, and in particular to a method for identifying a pseudo base station, an apparatus, and a mobile terminal.

BACKGROUND

"Pseudo base station" refers to a fake base station. The pseudo base station may generally be composed of a host device and a laptop computer. It may search and obtain information of mobile phone cards, which locate within a certain radius centered on the pseudo base station, through a message group sender, a message sender and other related devices. Due to shortcomings of mobile communication, the pseudo base station may disguise itself to be a base station of an operator, using mobile phone numbers to send short messages, such as scams and advertisement, to users' mobile phones.

SUMMARY

According to a first aspect, the present disclosure provides a method for identifying a pseudo base station for a mobile terminal, including: obtaining a tracking area code (TAC) value of a detected base station; obtaining a reference TAC value of a legal base station; and determining the detected base station to be the pseudo base station in response to a difference value between the TAC value of the detected base station and the reference TAC value satisfying a target condition.

According to a second aspect, the present disclosure provides a mobile terminal, including one or more processors and a memory. One or more programs are stored in the memory and are configured to be executed by one or more processors, and the one or more programs are configured to perform the above-mentioned method.

According to a third aspect, the present disclosure provides a computer-readable storage medium, wherein a computer code is stored in the computer-readable storage medium. When the program code is running, the above-mentioned method may be performed.

BRIEF DESCRIPTION OF DRAWINGS

In order to clearly explain the technical solutions of the embodiments of the present disclosure, the accompanying drawings in the description of the embodiments will be briefly described below. Obviously, the drawings in the following description show merely some embodiments of the present disclosure. For any ordinary skilled person in the art, other drawings may also be obtained based on these drawings without any creative work.

DETAILED DESCRIPTION

Figure 1:
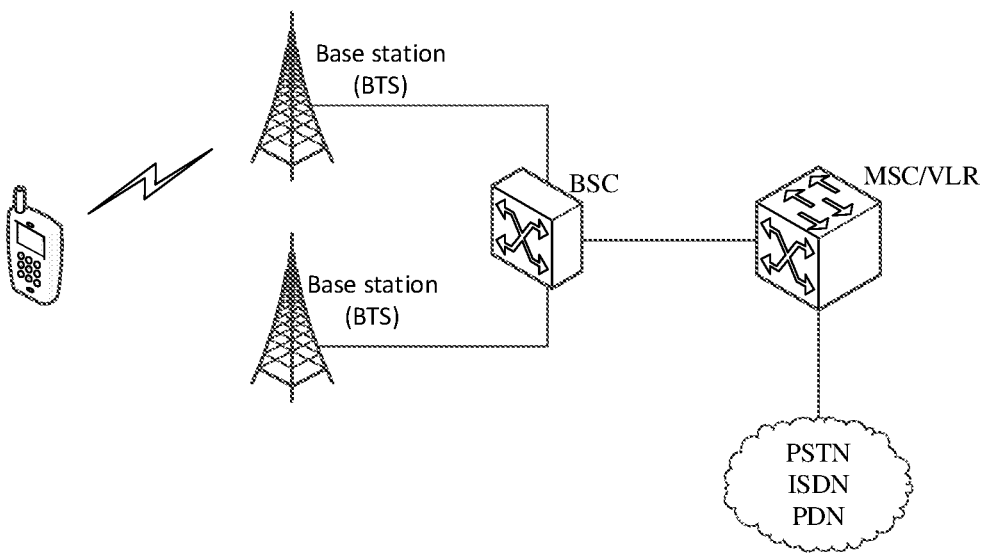
FIG. 1 is a schematic diagram of an architecture of a mobile communication network system.

Technical solutions of the embodiments of the present disclosure will be described clearly and completely by referring to the accompanying drawings in the embodiments. Based on the embodiments in the present disclosure, all other embodiments obtained by an ordinary skilled person in the art without creative work shall fall within the scope of the present disclosure.

With the development of mobile communication, the mobile communication has experienced various versions, including 2G, 3G and 4G. Regardless of the GSM (Global System for Mobile) communication system or the CDMA (Code Division Multiple Access) communication system in the early 2G era or the LTE system in the later 4G era, the base station is an important communication device.

According to a first aspect, the present disclosure provides a method for identifying a pseudo base station for a mobile terminal, including: obtaining a tracking area code (TAC) value of a detected base station; obtaining a reference TAC value of a legal base station; and determining the detected base station to be the pseudo base station in response to a difference value between the TAC value of the detected base station and the reference TAC value satisfying a target condition.

In some embodiments, the target condition includes at least one of a first condition and a second condition. The first condition indicates that the difference value between the TAC value of the detected base station and the reference TAC value is greater than a threshold, and the second condition indicates that the difference value between the TAC value of the detected base station and the reference TAC value is within a target interval.

In some embodiments, the target condition includes either one of the first condition and the second condition, in response to a strength of a wireless signal broadcasted by the detected base station being greater than threshold strength.

In some embodiments, the target condition includes both the first condition and the second condition in response to a strength of a wireless signal broadcasted by the detected base station being not greater than threshold strength.

In some embodiments, the target condition includes both the first condition and the second condition in response to a moving speed of the mobile terminal being greater than a threshold speed.

In some embodiments, the target condition includes either one of the first condition and the second condition in response to a moving speed of the mobile terminal being not greater than a threshold speed.

In some embodiments, the obtaining a reference TAC value of a legal base station, includes: determining a current cell connection stage of the mobile terminal, wherein the cell connection stage includes a cell searching stage or a cell reselection stage; and obtaining the reference TAC value based on the determined cell connection stage.

In some embodiments, the obtaining the reference TAC value based on the determined cell connection stage, includes: taking a TAC value of a base station, which is the closest to a current location of the mobile terminal and is among legal base stations that the mobile terminal successfully registered within a preset time period, as the reference TAC value, in response to the mobile terminal being detected to be in the cell searching stage.

In some embodiments, the obtaining the reference TAC value based on the determined cell connection stage, includes: taking a TAC value of a base station that the mobile terminal successfully registered in a latest time as the reference TAC value, in response to the mobile terminal being detected to be in the cell reselection stage.

In some embodiments, the detected base station is determined as the pseudo base station in response to the difference value between the TAC value of the detected base station and the reference TAC value satisfying the target condition and the cell ID of the detected base station dis-satisfying a target format.

According to a second aspect, the present disclosure provides a mobile terminal, including one or more processors and a memory. One or more programs are stored in the memory and are configured to be executed by one or more processors, and the one or more programs are configured to perform operations of: obtaining a tracking area code (TAC) value of a detected base station; obtaining a reference TAC value of a legal base station; and determining the detected base station to be a pseudo base station in response to a difference value between the TAC value of the detected base station and the reference TAC value satisfying a target condition.

In some embodiments, the target condition includes at least one of a first condition and a second condition. The first condition indicates that the difference value between the TAC value of the detected base station and the reference TAC value is greater than a threshold, and the second condition indicates that the difference value between the TAC value of the detected base station and the reference TAC value is within a target interval.

In some embodiments, the target condition includes either one of the first condition and the second condition, in response to a strength of a wireless signal broadcasted by the detected base station being greater than threshold strength.

In some embodiments, the target condition includes both the first condition and the second condition, in response to a strength of a wireless signal broadcasted by the detected base station being not greater than threshold strength.

In some embodiments, the target condition includes both the first condition and the second condition, in response to a moving speed of the mobile terminal being greater than a threshold speed.

In some embodiments, the target condition includes either one of the first condition and the second condition, in response to a moving speed of the mobile terminal being not greater than a threshold speed.

In some embodiments, while obtaining the reference TAC value of the legal base station, the one or more programs are further configured to perform operations of: determining a current cell connection stage of the mobile terminal, wherein the cell connection stage includes a cell searching stage or a cell reselection stage; and obtaining the reference TAC value based on the determined cell connection stage.

In some embodiments, while obtaining the reference TAC value based on the determined cell connection stage, the one or more programs are further configured to perform operations of: taking a TAC value of a base station, which is the closest to a current location of the mobile terminal and is among legal base stations that the mobile terminal successfully registered within a preset time period, as the reference TAC value, in response to the mobile terminal being detected to be in the cell searching stage.

In some embodiments, while obtaining the reference TAC value based on the determined cell connection stage, the one or more programs are further configured to perform operations of: taking a TAC value of a base station that the mobile terminal successfully registered in a latest time as the reference TAC value, in response to the mobile terminal being detected to be in the cell reselection stage.

According to a third aspect, the present disclosure provides a computer-readable storage medium. A computer code is stored in the computer-readable storage medium, and the program code is executed to perform operations of: obtaining, by the mobile terminal, a TAC value of a detected base station; obtaining a reference TAC value, wherein the reference TAC value may be a TAC value of a legal base station; comparing the TAC value of the detected base station to the reference TAC value; and determining the detected base station to be the pseudo base station in response to a difference value between the TAC value of the detected base station and the reference TAC value satisfying a target condition.

Figure 2:
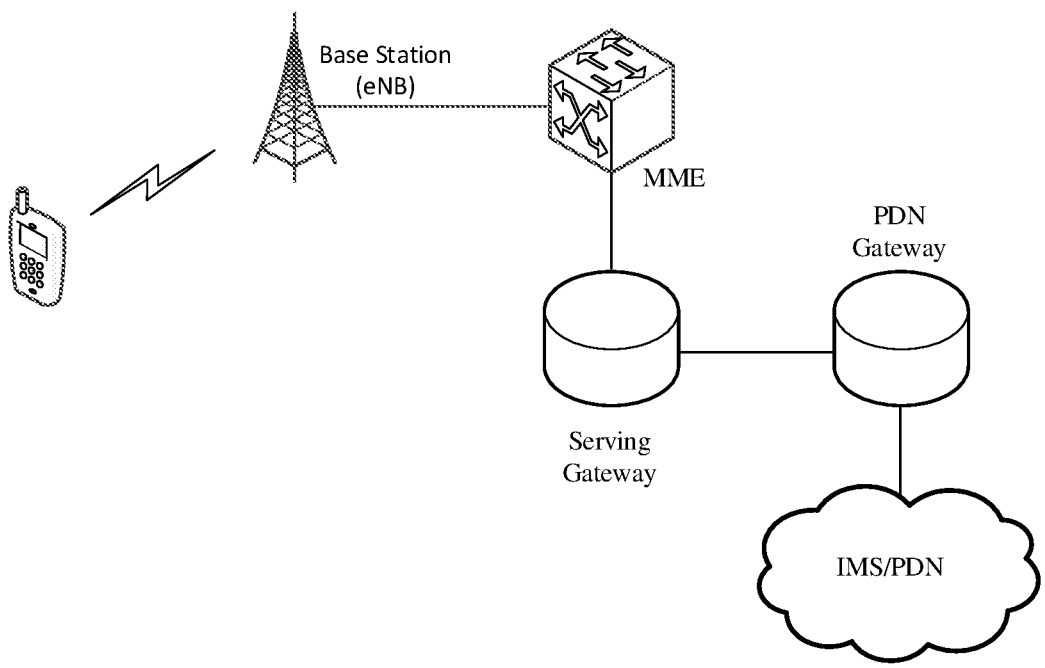
FIG. 2 is a schematic diagram of another architecture of a mobile communication network system.

For example, FIG. 1 is a schematic diagram of an architecture of a mobile communication network system. A base station BTS serves as an access device for mobile communication and is connected to a Base Station Controller (BSC), and the BSC is further connected to a mobile switching center (MSC). As another example, FIG. 2 is a schematic diagram of a 4G mobile communication network system. A base station eNB is connected to a mobility management entity (MME), and the MME is connected to a serving gateway. As shown in FIG. 1 and FIG. 2, in the mobile communication system, the base station is a device that directly establishes a connection with the mobile terminal, and plays a significant role in the entire system architecture. The base station generally refers to a "public mobile communication base station", and provides signals to mobile terminals, such as mobile phones and tablet computers. With the development of communication, the applicant discovers that pseudo base stations exist.

A pseudo base station refers to a fake base station. The pseudo base station may generally be composed of a host device and a laptop computer. It may search and obtain mobile phone card information, which locates within a certain radius centered on the pseudo base station, through a message group sender, a message sender and other related devices. Due to shortcomings of mobile communication, the pseudo base station may disguise itself to be a base station of an operator, using mobile phone numbers to send short messages, such as scams and advertisement, to users' mobile phones.

When the pseudo base station device is running, a wireless signal sent by the mobile terminal may be forced to connect to the pseudo base station, resulting in the mobile terminal unable to use services provided by a legal operator. The mobile terminal may temporarily go offline for 8 seconds to 12 seconds and return to normal connection. Some mobile terminals must be switched off and on to reconnect to a network. In addition, connection to the pseudo base station may cause a user of the mobile terminal to frequently update locations, such that wireless network resources in a certain area may be tight, causing network congestion and affecting the user's normal communication.

Therefore, the applicant provides a method for identifying the pseudo base station, an apparatus, and a mobile terminal, reducing a possibility of accessing to the pseudo base station and improving information security of the mobile terminal.

The embodiments of the present disclosure will be described in detail by referring to the drawings.

Figure 3:
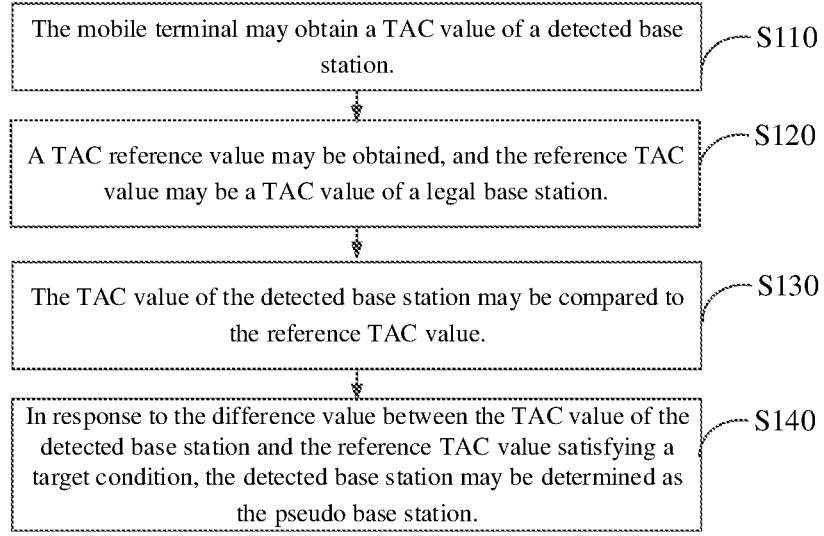
FIG. 3 is a flow chart of a method for identifying a pseudo base station according to an embodiment of the present disclosure.

FIG. 3 is a flow chart of a method for identifying a pseudo base station according to an embodiment of the present disclosure. The method may include following operations.

In an operation S110, the mobile terminal may obtain a tracking area code (TAC) value of a detected base station.

Generally, a network air interface may be configured to perform information interaction between the mobile terminal and the base station of the mobile communication network. The information in the network air interface may be carried by various logical channels. The logical channels may include two major categories: a traffic channel (TCH) and a control channel (CCH). The TCH may substantially provide transmitting services between the network and the mobile terminal, such as voice and data. The CCH may substantially be configured to transmit signaling information and short packet data. A broadcast channel (BCH) in the CCH may be configured to transmit information by broadcasting. The base station may take a broadcast control channel (BCCH) in the BCH to broadcast public information to the mobile terminal, such as a system message.

While the mobile terminal detecting the base station, the system message broadcasted by the base station may be detected, such that the TAC value of the detected base station may be parsed from the system message. In detail, taking the LTE mobile communication system as an example, the system message broadcasted by the LTE base station may include two categories: a Master Information Block (MIB) message and a plurality of System Information Blocks (SIBs) messages. The MIB message may be transmitted in the PBCH without RNTI scrambling, whereas the SIB messages may be transmitted in the PDSCH with SI-RNTI scrambling. When a network side device (the LTE base station) is switched on, the device may firstly send the MIB message, and subsequently send a series of SIB messages. Various SIB messages may carry various parameters. For example, SIB1 may substantially carry information in regard to cell access and cell selection, as well as LTE-TDD subframe configuration, scheduling other SIB blocks, and window information of the SIB1, etc. SIB2 may substantially carry information in regard to public radio resource configuration, including information in regard to access to BAR, information in regard to PRACH configuration, information in regard to an uplink frequency, MBSFN configuration, etc. SIB3 may carry public information in regard to intra-frequency, inter-frequency, and reselection of inter-mode cells. SIB4 may carry adjacent cell information for intra-frequency cell reselection. SIB5 may carry adjacent cell information for inter-frequency cell reselection. SIB6 may carry adjacent cell information for inter-mode (UTRA) cell reselection. SIB7 may carry adjacent cell information for inter-mode (GERAN) cell reselection. SIB8 may carry adjacent cell information for inter-mode (CDMA2000) cell reselection. SIB9 may carry information in regard to HOME eNB (HNB). SIB10/11 may carry information in regard to an earthquake and tsunami warning system (ETWS). When the UE decodes a paging message and finds that an ETWS message is present, specific ETWS content may be obtained from the SIB10/11.

SIB12 may carry information in regard to a commercial mobile alerting system (CMAS). When the UE decodes from the paging message and finds that a CMAS message is present, specific CMAS content may be obtained from the SIB12. SIB13 may carry information in regard to multimedia broadcasting multicast service (MBMS). The mobile terminal may obtain the TAC value of the base station from the SIB1.

A tracking area may be a concept established by the LTE system for managing a location of user equipment (UE), such as the mobile terminal in the present embodiment. A function of the tracking area may be similar to that of a location area (LA) and a routing area (RA) in the 3G system. A core network may obtain a location of the UE in an idle state through information of the tracking area, and may page the UE in response to a data service requirement being present. One tracking area may include one or more cells, and one cell may only belong to one tracking area. In this way, an identifier of the tracking area may be the TAC value in the present disclosure.

In an implementation, the identifier of the TAC may be referred as a tracking area identity (TAI), and the TAI may be composed of PLMN and the TAC. TAI=PLMN+TAC.

In an implementation, in response to the mobile terminal being installed with an Android operating system, the mobile terminal may invoke the TelephonyManager to obtain data that has been parsed out from the system message by the mobile terminal.

In an operation S120, a TAC reference value may be obtained, and the reference TAC value may be a TAC value of a legal base station.

It should be noted that, in the present disclosure, obtaining the reference TAC value may be to compare the reference TAC value with the TAC value of the base station currently detected by the mobile terminal. In this way, the mobile terminal may determine whether the detected base station is a pseudo base station based on a comparison result. In this case, the obtained reference TAC value may be the TAC value of the legal base station.

It should be understood that the TAC value of the base station may generally be configured based on certain rules. For example, TAC values of various base stations belonging to a same tracking area may be configured to be identical or similar. However, the TAC value of the pseudo base station may usually be relatively large.

In an implementation, the mobile terminal may store TAC values of all legal base stations in advance. For example, alternatively, the mobile terminal may store the TAC values of all legal base stations based on regions of the legal base stations. The regions may be defined by users based on location information, such as latitudes and longitudes, or may be administrative regions. When the mobile terminal detects that a previous region where the mobile terminal located is changed, the mobile terminal may re-determine the reference TAC value based on a current region. For example, the mobile terminal currently locates in a region A, the mobile terminal may take a TAC value of a legal base station configured in the region A as the reference TAC value. In response to the mobile terminal moving from the region A to a region B, the mobile terminal may take a TAC value of a legal base station configured in the region B as the reference TAC value.

It should be noted that, while storing the TAC value of the base station, the TAC value and location information of the base station may be stored correspondingly. In this way, in response to various TAC values of various base stations being present in one region, the mobile terminal may determine a TAC value of one of the various base stations closest to the mobile terminal to be the reference TAC value based on location information of the various base stations.

In an operation S130, the TAC value of the detected base station may be compared to the reference TAC value.

Alternatively, while the mobile terminal comparing the TAC value of the detected base station to the reference TAC value, the mobile terminal may directly obtain a mathematical difference value between the TAC value of the detected base station and the reference TAC value. Alternatively, the mobile terminal may obtain a mathematical difference value between the number of digits of data included in the TAC value of the detected base station and that included in the reference TAC value.

In an operation S140, in response to the difference value between the TAC value of the detected base station and the reference TAC value satisfying a target condition, the detected base station may be determined as the pseudo base station.

As described in the above, the TAC value of the pseudo base station may be greater than that of the legal base station. Therefore, whether the detected base station is a pseudo base station may be determined by comparing the TAC value of the detected base station to the reference TAC value.

In an implementation, the target condition may include at least one of a first condition and a second condition. The first condition may indicate that the difference value between the TAC value of the detected base station and the reference TAC value is greater than a threshold; and the second condition may indicate that the difference value between the TAC value of detected base station and the reference TAC value is within a target interval. It should be noted that a minimum value of the target interval may be greater than the threshold.

The mobile terminal may determine the target condition based on a current environment of the mobile terminal in real time. The environment may be a wireless environment or a location environment.

For example, the mobile terminal may determine content included in the target condition based on strength of a wireless signal broadcasted by the detected base station.

It should be understood that, in order to attract mobile terminals to access to the pseudo base station, the pseudo base station may broadcast the wireless signal with a relatively large power. In this way, in an implementation, in response to the mobile terminal detecting that the strength of the wireless signal broadcasted by the detected base station is greater than threshold strength, the mobile terminal may determine that the target condition includes either one of the first condition and the second condition, i.e., either the difference value between the TAC value of the detected base station and the reference TAC value being greater than the threshold or the difference value between the TAC value of the detected base station and the reference TAC value being within the target interval, such that the mobile terminal may intend to determine the detected base station to be the pseudo base station, thereby ensuring the information security of the mobile terminal.

In another implementation, in response to the mobile terminal detecting that the strength of the wireless signal broadcasted by the detected base station is not greater than the threshold strength, the mobile terminal may determine that the target condition includes both the first condition and second condition, i.e., both the difference value between the TAC value of the detected base station and the reference TAC value being greater than the threshold and the difference value between the TAC value of the detected base station and the reference TAC value being within the target interval. It should be understood that, a probability that the detected base station is a pseudo base station in case of the strength of the wireless signal broadcasted by the detected base station being not greater than the threshold strength may be less than a possibility that the detected base station is a pseudo base station in case of the strength of the wireless signal broadcasted by the detected base station being greater than the threshold strength. Therefore, an accuracy rate of identifying the pseudo base station may be improved by determining the target condition to include more restrictive conditions, so as to avoid identifying the legal base station to be the pseudo base station.

In addition to the mobile terminal determining the target condition based on the wireless environment, the mobile terminal may determine the target condition based on a current geographical location of the mobile terminal.

For example, in response to the mobile terminal being at rest at a location or moving in a relatively low speed, the mobile terminal may access the detected base station easily. In response to the mobile terminal moving in a high speed, even if the base station detected by the mobile terminal is a pseudo base station, the mobile terminal may not access to the detected base station due to the high speed, and may not access to any base station.

In this case, in response to the mobile terminal detecting that a moving speed of the mobile terminal is greater than a threshold speed, the mobile terminal may determine the target condition to include both the first condition and the second condition. The first condition may indicate that the difference value between the TAC value of the detected base station and the reference TAC value is greater than the threshold, and the second condition may indicate that the difference value between the TAC value of the detected base station and the reference TAC value is within the target interval. In response to the mobile terminal detecting that the moving speed of the mobile terminal is not greater than the threshold speed, the mobile terminal may determine the target condition to include either the first condition and the second condition. The first condition may indicate that the difference value between the TAC value of the detected base station and the reference TAC value is greater than the threshold, and the second condition may indicate that the difference between the TAC value of the detected base station and the reference TAC value is within the target interval.

As described in the above, the content included in the target condition may be determined based on the current environment, enabling the mobile terminal to determine the content included in the target condition at will, such that the target condition may be adaptively changed.

It should be noted that, in response to the TAC value of the pseudo base station being configured to be similar to the TAC value of the legal base station, the mobile terminal may mistakenly identify the pseudo base station as the legal base station. In an implementation, in response to the difference value between the TAC value of the detected base station and the reference TAC value satisfying the target condition, the detected base station may be determined to be a suspected pseudo base station; a cell ID of the suspected pseudo base station may be acquired; and the suspected pseudo base station may be determined as the pseudo base station in response to the cell ID not satisfying a target format.

The present disclosure provides a method for identifying the pseudo base station. The mobile terminal may obtain the TAC value of the detected base station, and obtain the reference TAC value. The reference TAC value may be the TAC value of the legal base station. The TAC value of the detected base station may be compared to the reference TAC value. In response to the difference value between the TAC value of the detected base station and the reference TAC value satisfying the target condition, the detected base station may be determined to be the pseudo base station. In this way, the probability of the mobile terminal accessing the pseudo base station may be reduced, user information stored in the mobile terminal may be protected from being stolen, and the information security of the mobile terminal may be improved.

Figure 4:
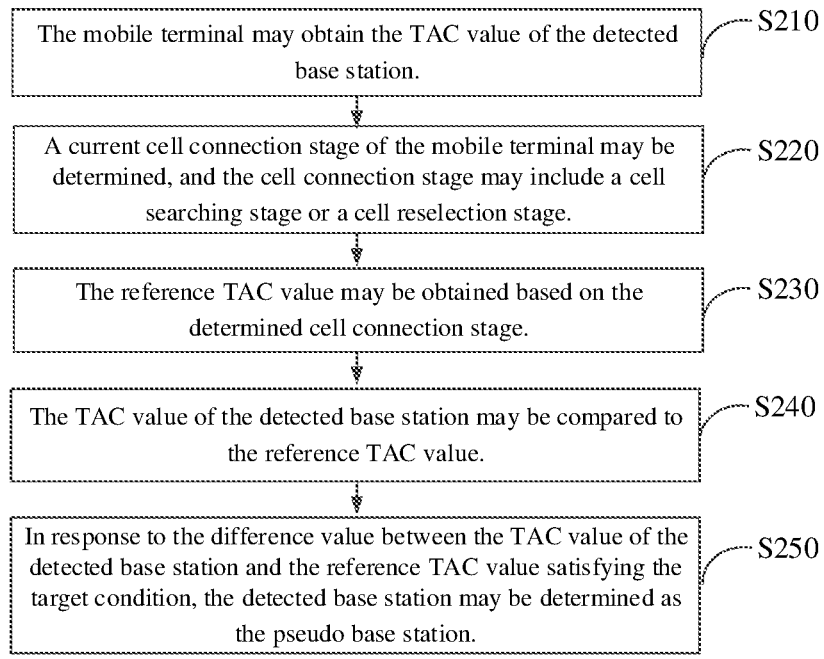
FIG. 4 is a flow chart of a method for identifying a pseudo base station according to another embodiment of the present disclosure.

As shown in FIG. 4, the present disclosure provides a method for identifying the pseudo base station, and the method may be applied in a mobile terminal. The method my include following operations.

In an operation S210, the mobile terminal may obtain the TAC value of the detected base station.

In an operation S220, a current cell connection stage of the mobile terminal may be determined, and the cell connection stage may include a cell searching stage or a cell reselection stage.

It should be understood that cell searching may be started in response to the mobile terminal being switched on or switched from a flight mode to an online mode. While performing the cell searching, the mobile terminal may receive data from various center frequency points of the cell of the mobile network (such as the LTE network) and may calculate bandwidth RSSI. Presence of the cell adjacent to the frequency points may be determined based on strength of the received signal. In response to the mobile terminal storing information in regard to the frequency point and the operator before the latest power-off, the mobile terminal may try to reside on the cell that the mobile terminal resides before the latest power-off. In response to prior information being not present, the entire frequency band may be searched, a frequency point with relatively high signal strength may be found, enabling the mobile terminal to try to reside on.

Cell reselection may refer to a process that the mobile terminal selects a best cell to provide a service signal by monitoring signal quality of an adjacent cell and a current cell in the idle mode. In response to the signal quality and a power level of the adjacent cell meeting an S criterion and a certain reselection decision criterion, the terminal may access and reside on the adjacent cell.

After the mobile terminal successfully resides, the mobile terminal may perform measurement on the current cell continually. An RRC layer may calculate Srxlev (the S criterion) based on an RSRP measurement result, and may compare the measurement result with Sintrasearch (start threshold for intra-frequency measurement) and Snonintrasearch (start threshold for inter-frequency/inter-system measurement). A comparison result may be taken as a decision condition for whether to start a measurement on the adjacent cell.

In an operation S230, the reference TAC value may be obtained based on the determined cell connection stage.

As described in the above, the process of connecting the mobile terminal to the base station may include a plurality of stages. In response to a same reference TAC value being taken in various stages, the pseudo base station may not be accurately identified. For example, in response to the mobile terminal switching to a power-off state in a region A and switching to a power-on state in a region B, or the mobile terminal switching to the flight mode in the region A and switching to the online mode in the region B, after the mobile terminal is powered on in the region A or switched to the online mode in the region A, the obtained reference TAC value may be the same as the TAC value of the base station in the region B. As the base stations in different regions may be configured with different TAC values, the pseudo base station may not be accurately identified.

In an implementation, in the present embodiment, the reference TAC value determined by the mobile terminal may be selected from the TAC values of legal base stations that are registered successfully.

In this case, in response to the mobile terminal being detected to be in the cell searching stage, the TAC value of the base station, which may be the closest to the current location of the mobile terminal and may be among the legal base stations that the mobile terminal successfully registered within a preset time period, may be taken as the reference TAC value.

It should be understood that the mobile terminal may start cell searching after switching from the power-off state to the power-on state or from the flight mode to the online mode. In this case, in order to avoid a base station being misidentified as the pseudo base station due to locations of the base station being changed, the mobile terminal may take the TAC value of the base station, which may be the closest to the current location of the mobile terminal and may be among the legal base stations that the mobile terminal successfully registered within the preset time period, as the reference TAC value.

In response to the mobile terminal being detected to be in the cell reselection stage, the TAC value of the base station that the mobile terminal successfully registered in a latest time may be taken as the reference TAC value.

It should be understood that, in response to the mobile terminal being in the cell reselection stage, and the detected base station being a base station adjacent to the base station that the mobile terminal currently resides on, the TAC value of the base station that the mobile terminal successfully registered in the latest time may be taken as the reference TAC value.

It should be noted that, in an implementation, in response to the mobile terminal being detected to be switched to the power-off state or the flight mode, the mobile terminal may store current location information. After the mobile terminal is in the power-on state or switching to the online mode, the current location information may be re-collected. The re-collected location information may be compared to the previously stored location information. In response to a distance of location change being greater than a threshold distance, and in response to the mobile terminal being detected to be in the cell searching stage, the TAC value of the base station, which may be the closest to the current location of the mobile terminal and may be among the legal base stations that the mobile terminal successfully registered within the preset time period, may be taken as the reference TAC value. In response to the distance of location change being not greater than the threshold distance, the TAC value of the base station that the mobile terminal successfully registered in the latest time may be taken as the reference TAC value.

The threshold distance may be a radius of a region covered by a base station, or may be a radius of a region covered by a tracking area. It should be understood that, in order to perform calculation easily, a region that is actually covered by the base station or the tracking area may be approximately deemed as a circular region. Therefore, the radius of the covered region may be calculated easily.

In an operation S240, the TAC value of the detected base station may be compared to the reference TAC value.

In an operation S250, in response to the difference value between the TAC value of the detected base station and the reference TAC value satisfying the target condition, the detected base station may be determined as the pseudo base station.

The present disclosure provides a method for identifying a pseudo base station. The mobile terminal may obtain the TAC value of the detected base station, and obtain the reference TAC value based on the current cell connection stage of the mobile terminal. The reference TAC value may be the TAC value of the legal base station. The TAC value of the detected base station may be compared to the reference TAC value. In response to the difference value between the TAC value of the detected base station and the reference TAC value satisfying the target condition, the detected base station may be determined to be the pseudo base station. In this way, the probability of the mobile terminal accessing the pseudo base station may be reduced, user information stored in the mobile terminal may be protected, and the information security of the mobile terminal may be improved.

Figure 5:
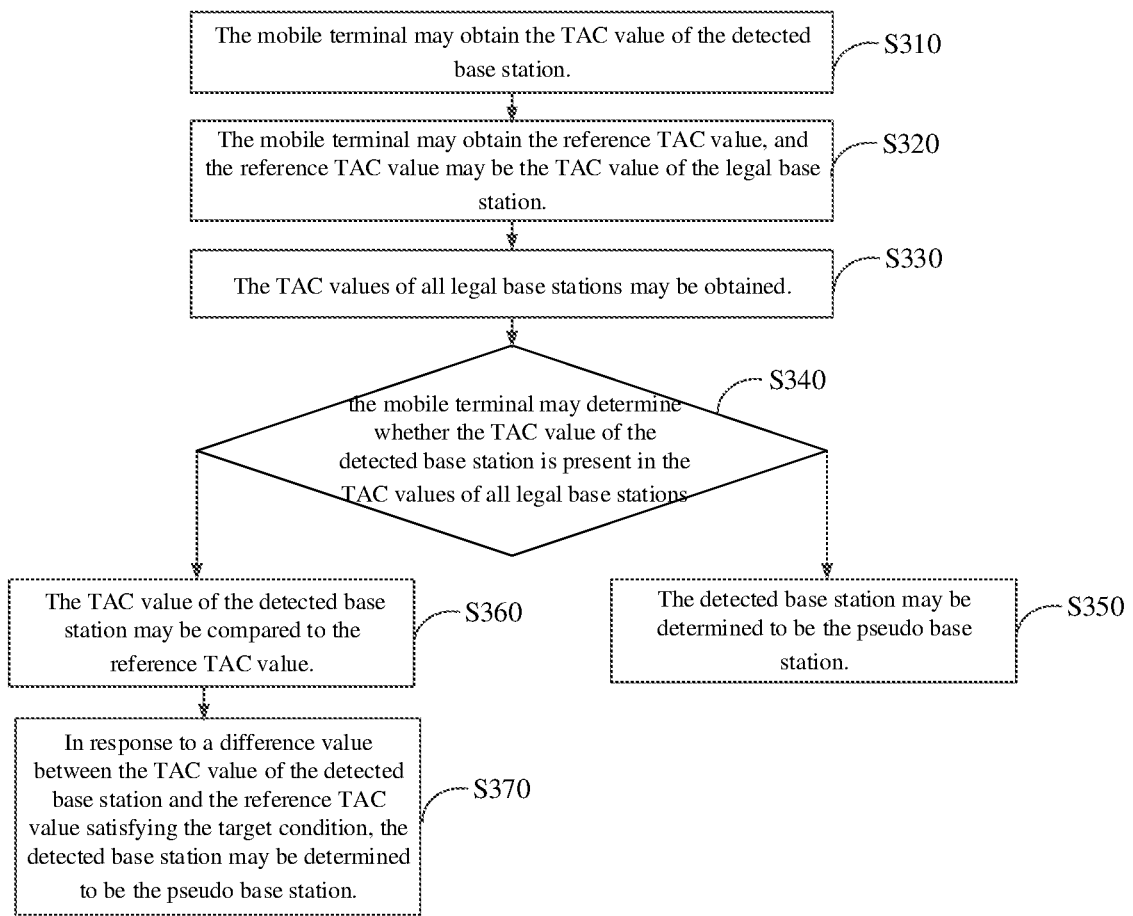
FIG. 5 is a flow chart of a method for identifying a pseudo base station according to still another embodiment of the present disclosure.

As shown in FIG. 5, the present disclosure provides a method for identifying a pseudo base station, and the method may be applied in the mobile terminal. The method may include following operations.

In an operation S310, the mobile terminal may obtain the TAC value of the detected base station.

In an operation S320, the mobile terminal may obtain the reference TAC value, and the reference TAC value may be the TAC value of the legal base station.

In an operation S330, the TAC values of all legal base stations may be obtained.

In an implementation, a location of the mobile terminal may be obtained; a target region may be obtained, the target region may be a region whose distance from the location of the mobile terminal is less than a threshold distance; the TAC values of all legal base stations in the target region may be obtained.

It should be understood that, similar to the above description, the TAC value of the base station may be configured based on certain rules. For example, the TAC values of a plurality of base stations belonging to a same tracking area may be configured to be identical or approximate. However, the TAC value of the pseudo base station may usually be large.

In an implementation, the mobile terminal may store the TAC values of all legal base stations in advance. For example, alternatively, the mobile terminal may store the TAC values of all legal base stations based on regions of the legal base stations. The regions may be defined by users based on location information, such as latitudes and longitudes, or may be administrative regions, or may be tracking areas.

In another implementation, the mobile terminal may send a TAC value acquisition request to the base station, which a cell that the mobile terminal currently resides on belongs to. The TAC value acquisition request may be configured to trigger the base station, which a cell that the mobile terminal currently resides on belongs to, to request the TAC values of all legal base stations from a target server. The mobile terminal may receive the TAC values of all legal base stations sent by the base station, which a cell that the mobile terminal currently resides on belongs to. The TAC values of all legal base stations are returned to the base station, which a cell that the mobile terminal currently resides on belongs to, through the target server. In addition, in response to the mobile terminal being currently connected to another AP (WirelessAccessPoint), the mobile terminal may send the TAC value acquisition request to the target server through the another connected AP.

It should be noted that the target server may be a server of a mobile communication service provider, and the TAC values of all base stations may be stored in the target server. In addition, the target server may be other servers.

In response to the mobile terminal detecting that a previous region where the mobile terminal located is changed, for example, the mobile terminal detecting that the location of the mobile terminal is changed for a distance greater than a target distance, the reference TAC value may be re-determined based on a current region. For example, the mobile terminal currently locates in a region A, the mobile terminal may take a TAC value of a legal base station configured in the region A as the reference TAC value. In response to the mobile terminal moving from the region A to a region B, the mobile terminal may take a TAC value of a legal base station configured in the region B as the reference TAC value.

When the base stations in a same tracking area are configured with different TAC values or at least two base stations are configured with different TAC values, and when the base station broadcasts the system message, the TAC value of the base station, which belongs to a same tracking area as the base station broadcasting the system message, may be broadcasted to the mobile terminal. In this way, the mobile terminal may store a tracking area (TA) list for storing all TAC values carried in the system message broadcasted by the base station. In response to the mobile terminal successfully registering on the base station which broadcasts the system message, all TAC values stored in the list may be taken as the TAC values of all legal base stations.

It should be noted that while storing the TAC values of all base stations, the TAC value and the location information of the base station may be stored correspondingly. When a plurality of TAC values are present in the region where the mobile terminal locates, the mobile terminal may determine a TAC value of a base station closest to the mobile terminal to be the reference TAC value based on the location information of the various base stations.

In an operation S340, the mobile terminal may determine whether the TAC value of the detected base station is present in the TAC values of all legal base stations.

In an operation S350, in response to the TAC value of the detected base station being absent in the TAC values of all legal base stations, the detected base station may be determined to be the pseudo base station.

In an operation S360, in response to the TAC value of the detected base station being present in the TAC values of all legal base stations, the TAC value of the detected base station may be compared to the reference TAC value.

In an operation S370, in response to the difference value between the TAC value of the detected base station and the reference TAC value satisfying the target condition, the detected base station may be determined to be the pseudo base station.

The present disclosure provides a method for identifying a pseudo base station. The mobile terminal may obtain the TAC value of the detected base station, and obtain the reference TAC value based on the current cell connection stage of the mobile terminal. The reference TAC value may be the TAC value of the legal base station. The TAC value of the detected base station may be compared to the reference TAC value. In response to the difference value between the TAC value of the detected base station and the reference TAC value satisfying the target condition, the detected base station may be determined to be the pseudo base station. In this way, the probability of the mobile terminal accessing the pseudo base station may be reduced, user information stored in the mobile terminal may be protected, and the information security of the mobile terminal may be improved.

Figure 6:
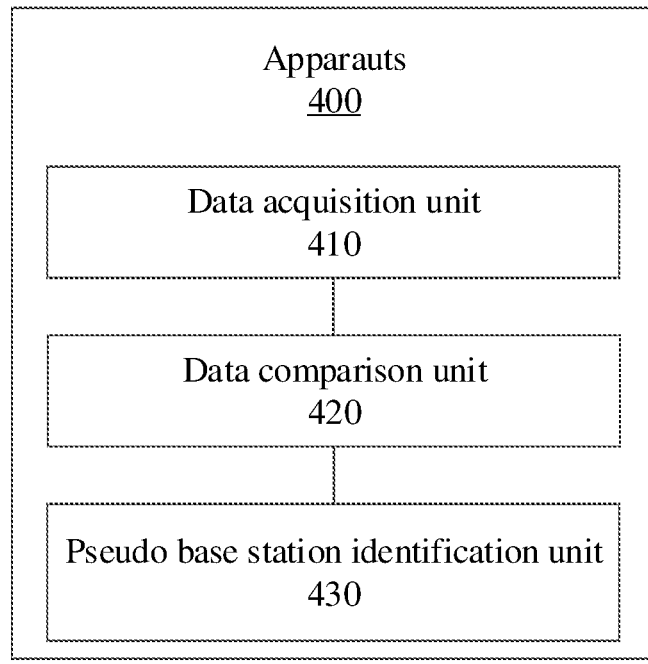
FIG. 6 is a structural diagram of an apparatus for identifying a pseudo base station according to an embodiment of the present disclosure.

As shown in FIG. 6, the present disclosure provides an apparatus 400 for identifying the pseudo base station, and the apparatus 400 may be run in a mobile terminal. The apparatus 400 may include: a data obtaining unit 410, a data comparison unit 420, and a pseudo base station identification 430.

The data obtaining unit 410 may be configured to obtain the TAC value of the detected base station.

The data obtaining unit 410 may further be configured to obtain the reference TAC value, and the reference TAC value may be the TAC value of the legal base station.

The data comparison unit 420 may be configured to compare the TAC value of the detected base station to the reference TAC value.

The pseudo base station identification 430 may be configured to determine the detected base station to be the pseudo base station in response to the difference value between the TAC value of the detected base station and the reference TAC value satisfying the target condition.

In an implementation, the pseudo base station identification 430 may specifically be configured to determine the detected base station to be the suspected pseudo base station in response to the difference value between the TAC value of the detected base station and the reference TAC value satisfying the target condition; obtaining the cell ID of the suspected pseudo base station; and determine the suspected pseudo base station to be the pseudo base station in response to the cell ID not satisfying the target format.

In another implementation, the apparatus may further include following units.

A signal strength acquisition unit may be configured to acquire strength of the wireless signal broadcasted by the detected base station.

A target condition configuration unit may be configured to configure the target condition to include either one of a first condition and a second condition, in response to the acquired strength of the wireless signal being greater than a threshold strength. The target condition configuration unit may further be configured to configure the target condition to include both the first condition and the second condition, in response to the acquired strength of the wireless signal being not greater than the threshold strength. The first condition may indicate that the difference value between the TAC value of the detected base station and the reference TAC value is greater than a threshold. The second condition may indicate that the difference value between the TAC value of the detected base station and the reference TAC value is within a target interval.

The present disclosure provides an apparatus for identifying a pseudo base station. The apparatus may obtain the TAC value of the detected base station, and obtain the reference TAC value. The reference TAC value may be the TAC value of the legal base station. The TAC value of the detected base station may be compared to the reference TAC value. In response to the difference value between the TAC value of the detected base station and the reference TAC value satisfying the target condition, the detected base station may be determined to be the pseudo base station. In this way, the probability of the mobile terminal accessing the pseudo base station may be reduced, user information stored in the mobile terminal may be protected, and the information security of the mobile terminal may be improved.

Figure 7:
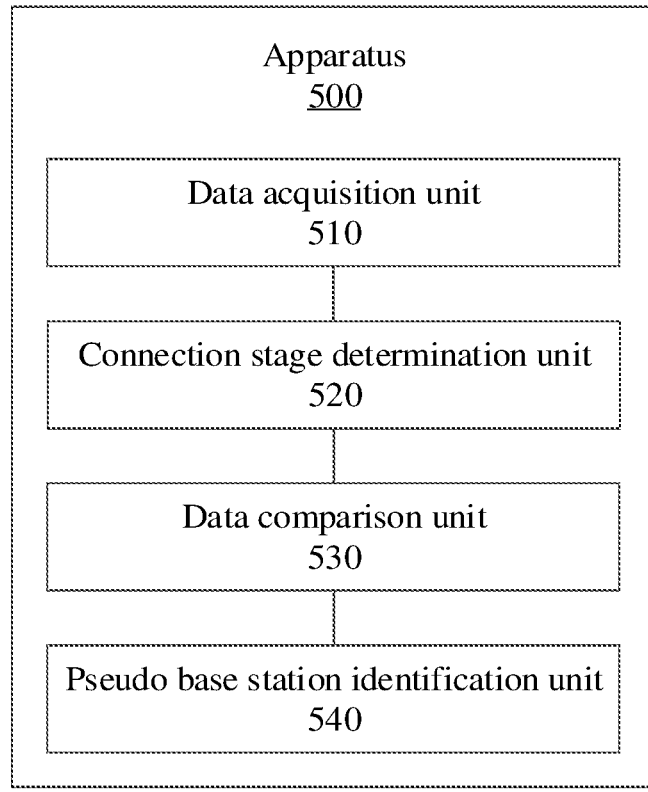
FIG. 7 is a structural diagram of an apparatus for identifying a pseudo base station according to another embodiment of the present disclosure.

As shown in FIG. 7, the present disclosure provides an apparatus 500 for identifying the pseudo base station, and the apparatus 500 may be run in a mobile terminal. The apparatus 500 may include: a data obtaining unit 510, a connection stage determination unit 520, a data comparison unit 530, and a pseudo base station identification unit 540.

The data obtaining unit 510 may be configured to acquire the TAC value of the detected base station.

The connection stage determination unit 520 may be configured to determine a current cell connection stage of the mobile terminal, and the cell connection stage may include a cell searching stage or a cell reselection stage.

The data obtaining unit 510 may further be configured to obtain the reference TAC value based on the determined cell connection stage.

In an implementation, the data obtaining unit 510 may specifically be configured to take the TAC value of the base station, which may be the closest to the current location of the mobile terminal and may be among the legal base stations that the mobile terminal successfully registered within a preset time period, as the reference TAC value, in response to the mobile terminal being detected to be in the cell searching stage.

In another implementation, the data obtaining unit 510 may specifically be configured to take the TAC value of the base station that the mobile terminal successfully registered in the latest time as the reference TAC value, in response to the mobile terminal being detected to be in the cell reselection stage.

The data comparison unit 530 may be configured to compare the TAC value of the detected base station to the reference TAC value.

The pseudo base station identification unit 540 may be configured to determine the detected base station to be the pseudo base station in response to the difference value between the TAC value of the detected base station and the reference TAC value satisfying the target condition.

The present disclosure provides an apparatus for identifying a pseudo base station. The apparatus may obtain the TAC value of the detected base station, and obtain the reference TAC value based on the current cell connection stage of the mobile terminal. The reference TAC value may be the TAC value of the legal base station. The TAC value of the detected base station may be compared to the reference TAC value. In response to the difference value between the TAC value of the detected base station and the reference TAC value satisfying the target condition, the detected base station may be determined to be the pseudo base station. In this way, the probability of the mobile terminal accessing the pseudo base station may be reduced, user information stored in the mobile terminal may be protected, and the information security of the mobile terminal may be improved.

Figure 8:
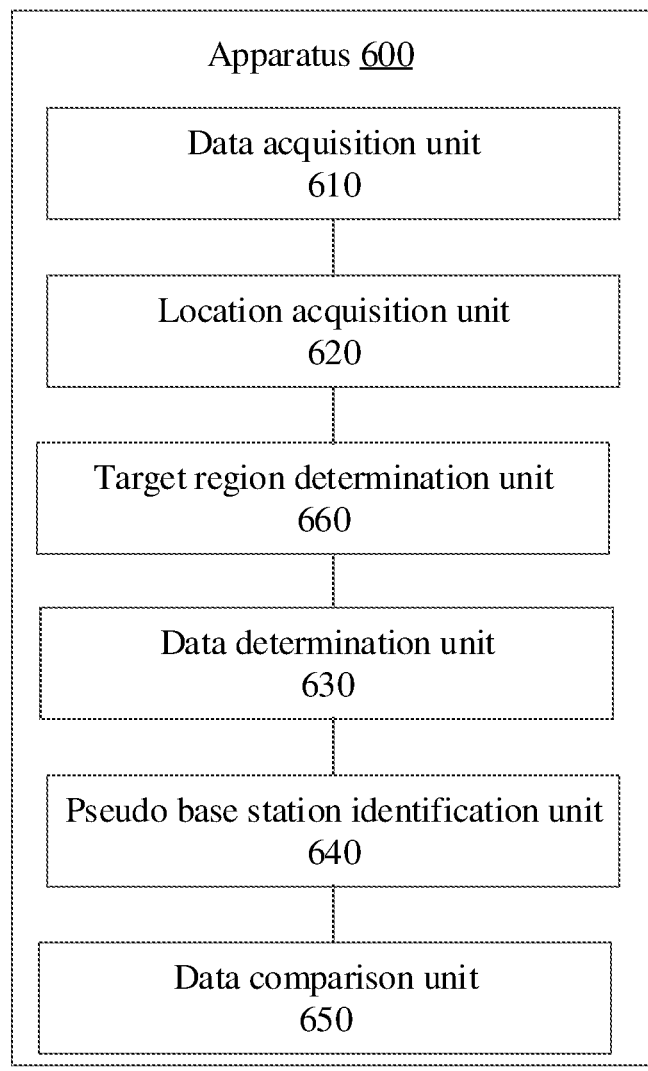
FIG. 8 is a structural diagram of an apparatus for identifying a pseudo base station according to still another embodiment of the present disclosure.

As shown in FIG. 8, the present disclosure provides an apparatus 600 for identifying the pseudo base station, and the apparatus 600 may be run on the mobile terminal. The apparatus 600 may include: a data obtaining unit 610, a location obtaining unit 620, a data determination unit 630, a pseudo base station identification unit 640, a data comparison unit 650, and a target region determination unit 660.

The data obtaining unit 610 may be configured for the mobile terminal to acquire the TAC value of the detected base station.

The data obtaining unit 610 may further be configured to obtain the reference TAC value. The reference TAC value may be the TAC value of the legal base station.

The data obtaining unit 610 may further be configured to obtain the TAC values of all legal base stations.

The location obtaining unit 620 may be configured to obtain the location of the mobile terminal.

The target region determination unit 660 may be configured to obtain a target region. The target region may be a region whose distance to the location of the mobile terminal is less than a threshold distance.

The data obtaining unit 610 may be configured to obtain the TAC values of all legal base stations in the target region.

The data determination unit 630 may be configured to determine whether the TAC value of the detected base station is present among the TAC values of all legal base stations.

The pseudo base station identification unit 640 may be configured to determine the detected base station to be the pseudo base station in response to the TAC value of the detected base station is absent in the TAC values of all legal base stations.

The data comparison unit 650 may be configured to compare the TAC value of the detected base station to the reference TAC value in response to the TAC value of the detected base station being present in the TAC values of all legal base stations.

The pseudo base station identification unit 640 may be configured to determine the detected base station to be the pseudo base station in response to the difference value between the TAC value of the detected base station and the reference TAC value satisfying the target condition.

The present disclosure provides an apparatus for identifying a pseudo base station. The apparatus may obtain the TAC value of the detected base station, and obtain the reference TAC value based on the current cell connection stage of the mobile terminal. The reference TAC value may be the TAC value of the legal base station. The TAC value of the detected base station may be compared to the reference TAC value. In response to the difference value between the TAC value of the detected base station and the reference TAC value satisfying the target condition, the detected base station may be determined to be the pseudo base station. In this way, the probability of the mobile terminal accessing the pseudo base station may be reduced, user information stored in the mobile terminal may be protected, and the information security of the mobile terminal may be improved.

It should be noted that any skilled person in the art should clearly understand that, in order to provide convenient and concise description, specific working processes of the apparatuses and units described in the above may refer to the corresponding processes in the foregoing method embodiments, which will not be repeated described hereinafter. In the embodiments provided in the present disclosure, coupling between the modules may be electrical, mechanical, or in other forms. In addition, each functional module in each embodiment of the present disclosure may be integrated into one processing module, or each module may be configured physically independently, or two or more modules may be integrated into one module. The above integrated module may be shown in the form of hardware or software function modules.

According to the present disclosure, the present disclosure provides a method for identifying the pseudo base station, an apparatus, and a mobile terminal. The mobile terminal may obtain the TAC value of the detected base station, and obtain the reference TAC value. The reference TAC value may be the TAC value of the legal base station. The TAC value of the detected base station may be compared to the reference TAC value. In response to the difference value between the TAC value of the detected base station and the reference TAC value satisfying the target condition, the detected base station may be determined to be the pseudo base station. In this way, the probability of the mobile terminal accessing the pseudo base station may be reduced, user information stored in the mobile terminal may be protected, and the information security of the mobile terminal may be improved.

The present disclosure further provides a mobile terminal, which will be described hereinafter by referring to FIG. 9.

Figures 9, 10:
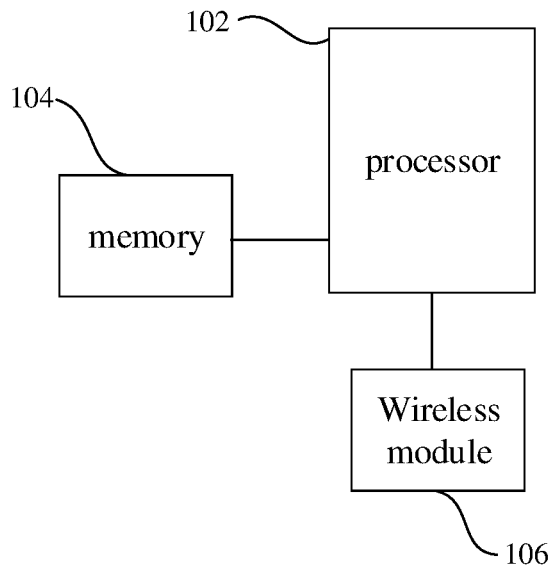
FIG. 9 is a structural diagram of a mobile terminal according to an embodiment of the present disclosure.
FIG. 10 is a storage unit for storing or carrying a program code for implementing a method for identifying a pseudo base station according to an embodiment of the present disclosure.

As shown in FIG. 9, based on the above method for identifying the pseudo base station and apparatus, the present disclosure further provides another mobile terminal 100 which may perform the method for identifying the pseudo base station as described in the above. The mobile terminal 100 may include one or more processors (only one is shown in the figure) coupled to each other, a memory 104, and a wireless module 106. The memory 104 may store a program that can execute the content in the above-mentioned embodiments. The processor 102 may execute the program stored in the memory 104.

The processor 102 may include one or more processing cores. The processor 102 may connect various components of the mobile terminal 100 through various interfaces and lines, and may perform various functions and process data of the mobile terminal 100 by running or executing instructions, programs, code sets or instruction sets stored in the memory 104 and by invoking data stored in the memory 104. Alternatively, the processor 102 may be achieved in at least one of the forms of digital signal processing (DSP), field programmable gate array (FPGA), programmable logic array (PLA). The processor 102 may integrate any one or a combination of a central processing unit (CPU), a graphics processing unit (GPU), and a modem. The CPU may substantially deal with the operating system, the user interface, application program, and so on. The GPU may be configured to render and draw displayed content. The modem may be configured for wireless communication. It should be understood that the above-mentioned modem may not be integrated into the processor 102, and may be implemented by one communication chip alone.

The memory 104 may include a random access memory (RAM) or a read-only memory (Read-Only Memory). The memory 104 may be configured to store instructions, programs, codes, code sets, or instruction sets. The memory 104 may include a program storage area and a data storage area. The program storage area may store instructions for implementing an operating system, instructions for implementing at least one function (such as a touch control function, a sound playback function, an image playback function, etc.), and instructions for implementing the above method embodiments. The data storage area may store data created by the terminal 100 while being used (such as a contact list, audio and video data, and chat history data).

The wireless module 106 may be configured to receive and send electromagnetic waves, and achieve the mutual conversion between the electromagnetic waves and electrical signals, so as to communicate with a communication network or other devices, such as communicating with an audio playing device. The wireless module 106 may include various circuit elements available in the art for performing these functions, such as antennas, radio frequency transceivers, digital signal processors, encryption/decryption chips, subscriber identity module (SIM) cards, memory, and so on. The wireless module 106 may communicate with various networks such as the Internet, an intranet, a wireless network, or communicate with other devices through the wireless network. The above-mentioned wireless network may include a cellular telephone network, a wireless local area network, or a metropolitan area network. For example, the wireless module 106 may exchange information with the base station.

As shown in FIG. 10, FIG. 10 is a structural diagram of a computer-readable storage medium according to an embodiment of the present disclosure. The computer-readable medium 800 may store a computer code, and the computer code may be invoked by the processor to perform method described in the above embodiments.

The computer-readable storage medium 800 may be an electronic memory such as a flash memory, an EEPROM (Electrically Erasable Programmable Read Only Memory), an EPROM, a hard drive, or a ROM. Alternatively, the computer-readable storage medium 800 may include a non-transitory computer-readable storage medium. The computer-readable storage medium 800 has a storage space for the program code 810 that performs any operation of the method as described in the above. These program codes may be read from or written into one or more computer program products. The program code 810 may be compressed in an appropriate manner.

It should be noted that the above embodiments are only described to illustrate the technical solutions of the present disclosure, but not to limit the scope of the present disclosure. Although the present disclosure is described in detail by referring to the above embodiments, any ordinary skilled person in the art should understand that modifications may be performed to the technical solutions described in the embodiments, or equivalent replacements to some of the technical features may be performed. The modifications or replacements do not cause the essence of the technical solutions to depart from the spirit and scope of the technical solutions of the embodiments of the present disclosure.

What is claimed is:

1. A method for identifying a pseudo base station for a mobile terminal, comprising:
   obtaining a tracking area code (TAC) value of a detected base station;
   obtaining a reference TAC value of a legal base station; and
   determining the detected base station to be a pseudo base station in response to a difference value between the TAC value of the detected base station and the reference TAC value satisfying a target condition,
   wherein obtaining the reference TAC value of the legal base station, comprises:
      determining a current cell connection stage of the mobile terminal, wherein the cell connection stage comprises a cell searching stage or a cell reselection stage; and
      obtaining the reference TAC value based on the current cell connection stage;
   wherein obtaining the reference TAC value based on the determined cell connection stage, comprises:
      taking a TAC value of a base station, which is the closest to a current location of the mobile terminal and is among legal base stations that the mobile terminal successfully registered within a preset time period, as the reference TAC value in response to the mobile terminal being detected to be in the cell searching stage.

2. The method according to claim 1, wherein the target condition comprises at least one of a first condition and a second condition, wherein
   the first condition indicates that the difference value between the TAC value of the detected base station and the reference TAC value is greater than a threshold; and
   the second condition indicates that the difference value between the TAC value of the detected base station and the reference TAC value is within a target interval.

3. The method according to claim 2, wherein the target condition comprises either one of the first condition or the second condition in response to a strength of a wireless signal broadcasted by the detected base station being greater than threshold strength.

4. The method according to claim 2, wherein the target condition comprises both the first condition and the second condition in response to a strength of a wireless signal broadcasted by the detected base station being not greater than threshold strength.

5. The method according to claim 2, wherein the target condition comprises both the first condition and the second condition in response to a moving speed of the mobile terminal being greater than a threshold speed.

6. The method according to claim 2, wherein the target condition comprises either one of the first condition or the second condition in response to a moving speed of the mobile terminal being not greater than a threshold speed.

7. The method according to claim 1, wherein obtaining the reference TAC value based on the determined cell connection stage, comprises:
   taking a TAC value of a base station that the mobile terminal successfully registered in a latest time as the reference TAC value in response to the mobile terminal being detected to be in the cell reselection stage.

8. The method according to claim 1, wherein the detected base station is determined as the pseudo base station in response to the difference value between the TAC value of the detected base station and the reference TAC value satisfying the target condition and the cell ID of the detected base station dis-satisfying a target format.

9. A mobile terminal, comprising one or more processors and a memory, wherein one or more programs are stored in the memory and are configured to be executed by one or more processors, and the one or more programs are configured to perform operations of:
   obtaining a tracking area code (TAC) value of a detected base station;
   obtaining a reference TAC value of a legal base station; and
   determining the detected base station to be a pseudo base station in response to a difference value between the TAC value of the detected base station and the reference TAC value satisfying a target condition,
   wherein obtaining the reference TAC value of the legal base station, comprises:

determining a current cell connection stage of the mobile terminal, wherein the cell connection stage comprises a cell searching stage or a cell reselection stage; and obtaining the reference TAC value based on the current cell connection stage;

wherein obtaining the reference TAC value based on the determined cell connection stage, comprises:

taking a TAC value of a base station, which is the closest to a current location of the mobile terminal and is among legal base stations that the mobile terminal successfully registered within a preset time period, as the reference TAC value in response to the mobile terminal being detected to be in the cell searching stage.

10. The mobile terminal according to claim 9, wherein the target condition comprises at least one of a first condition and a second condition, wherein the first condition indicates that the difference value between the TAC value of the detected base station and the reference TAC value is greater than a threshold; and the second condition indicates that the difference value between the TAC value of the detected base station and the reference TAC value is within a target interval.

11. The mobile terminal according to claim 10, wherein the target condition comprises either one of the first condition or the second condition in response to a strength of a wireless signal broadcasted by the detected base station being greater than threshold strength.

12. The mobile terminal according to claim 10, wherein the target condition comprises both the first condition and the second condition, in response to a strength of a wireless signal broadcasted by the detected base station being not greater than threshold strength.

13. The mobile terminal according to claim 10, wherein the target condition comprises both the first condition and the second condition, in response to a moving speed of the mobile terminal being greater than a threshold speed.

14. The mobile terminal according to claim 10, wherein the target condition comprises either one of the first condition or the second condition in response to a moving speed of the mobile terminal being not greater than a threshold speed.

15. The mobile terminal according to claim 9, wherein while obtaining the reference TAC value based on the determined cell connection stage, the one or more programs are further configured to perform operations of:

taking a TAC value of a base station that the mobile terminal successfully registered in a latest time as the reference TAC value in response to the mobile terminal being detected to be in the cell reselection stage.

16. A non-transitory computer-readable storage medium, wherein a program code is stored in the computer-readable storage medium, and the program code is executed to perform operations of:

obtaining a tracking area code (TAC) value of a detected base station;

obtaining a reference TAC value of a legal base station; and determining the detected base station to be a pseudo base station in response to a difference value between the TAC value of the detected base station and the reference TAC value satisfying a target condition that comprises at least one of a first condition or a second condition, wherein the first condition indicates that the difference value between the TAC value of the detected base station and the reference TAC value is greater than a threshold, and the second condition indicates that the difference value between the TAC value of the detected base station and the reference TAC value is within a target interval, and wherein the target condition comprises one of the first condition or the second condition in response to a strength of a wireless signal broadcasted by the detected base station being greater than a threshold strength, and the target condition comprises both the first condition and the second condition in response to the strength of the wireless signal broadcasted by the detected base station being less than the threshold strength, or wherein the target condition comprises both the first condition and the second condition in response to a moving speed of the mobile terminal being greater than a threshold speed, and the target condition comprises either one of the first condition or the second condition in response to the moving speed of the mobile terminal being less than the threshold speed.

* * * * *